(12) United States Patent
Barabe et al.

(10) Patent No.: US 7,721,226 B2
(45) Date of Patent: May 18, 2010

(54) GLOM WIDGET

(75) Inventors: Benoit Barabe, Snoqualmie, WA (US); Kentaro Urata, Kirkland, WA (US); Alex J. Simmons, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 652 days.

(21) Appl. No.: 10/782,133

(22) Filed: Feb. 18, 2004

(65) Prior Publication Data

US 2005/0183029 A1   Aug. 18, 2005

(51) Int. Cl.
*G06F 3/048* (2006.01)
(52) U.S. Cl. ...................... 715/810; 715/708
(58) Field of Classification Search ................. 715/856, 715/863, 808, 708, 711, 862; 345/173, 179
See application file for complete search history.

(56) References Cited

U.S. PATENT DOCUMENTS

| | | | |
|---|---|---|---|
| 2,354,332 A | 7/1944 | Polydorof | 343/788 |
| 5,063,376 A | 11/1991 | Chang | 345/163 |
| 5,063,600 A | 11/1991 | Norwood | 345/173 |
| 5,133,076 A | 7/1992 | Hawkins | 708/141 |
| 5,231,698 A | 7/1993 | Forcier | 715/541 |
| 5,321,768 A | 6/1994 | Fenrich | 328/178 |
| 5,327,342 A | 7/1994 | Roy | 345/467 |
| 5,339,391 A | 8/1994 | Wroblewski et al. | 345/607 |
| 5,347,295 A | 9/1994 | Agulnick et al. | 345/156 |
| 5,367,453 A | 11/1994 | Capps et al. | 715/531 |
| 5,390,281 A | 2/1995 | Luciw et al. | 395/12 |
| 5,404,442 A | 4/1995 | Foster et al. | 395/159 |
| 5,434,929 A | 7/1995 | Beernink et al. | 382/187 |
| 5,442,742 A | 8/1995 | Greyson et al. | 715/539 |
| 5,446,882 A | 8/1995 | Capps et al. | 707/104.1 |
| 5,465,325 A | 11/1995 | Capps et al. | 345/441 |
| 5,477,447 A | 12/1995 | Luciw et al. | 704/9 |
| 5,479,596 A | 12/1995 | Capps et al. | 715/539 |
| 5,491,495 A | 2/1996 | Ward et al. | 345/173 |
| 5,500,937 A | 3/1996 | Thompson-Rohrlich | 715/764 |
| 5,513,309 A | 4/1996 | Meier et al. | 715/860 |

(Continued)

FOREIGN PATENT DOCUMENTS

DE   40 26 852 A1   2/1991

(Continued)

OTHER PUBLICATIONS

G. Fitzmaurice et al., "Tracking Menus", CHI 2003, vol. 5, No. 2, pp. 71-80, 2003.

(Continued)

*Primary Examiner*—Kieu Vu
*Assistant Examiner*—Omar Abdul-Ali
(74) *Attorney, Agent, or Firm*—Merchant & Gould, P.C.

(57) ABSTRACT

The present invention provides a glom widget to the pen user of a PC that allows them to access contextual tools near a location where they are writing. If the user selects the glom widget, a context menu drops down that contains several of the most common tools and/or commands that a user creating handwriting might want to access. The glom widget menu can also contain contextual commands that are easier to comprehend and use since they are presented directly next to the content on the page to which they relate.

18 Claims, 4 Drawing Sheets

U.S. PATENT DOCUMENTS

| | | | |
|---|---|---|---|
| 5,517,578 A | 5/1996 | Altman et al. | 382/181 |
| 5,523,775 A | 6/1996 | Capps | 345/179 |
| 5,528,743 A | 6/1996 | Tou et al. | 715/541 |
| 5,544,295 A | 8/1996 | Capps | 345/473 |
| 5,544,358 A | 8/1996 | Capps et al. | 715/523 |
| 5,555,363 A | 9/1996 | Tou et al. | 715/541 |
| 5,559,942 A | 9/1996 | Gough et al. | 715/802 |
| 5,561,446 A | 10/1996 | Montlick | 345/173 |
| 5,579,467 A | 11/1996 | Capps | 715/507 |
| 5,583,542 A | 12/1996 | Capps et al. | 345/173 |
| 5,588,105 A | 12/1996 | Foster et al. | 715/779 |
| 5,590,257 A | 12/1996 | Forcier | 715/530 |
| 5,592,566 A | 1/1997 | Pagallo et al. | 382/187 |
| 5,594,640 A | 1/1997 | Capps et al. | 715/532 |
| 5,596,350 A | 1/1997 | Capps et al. | 345/173 |
| 5,596,694 A | 1/1997 | Capps | 345/473 |
| 5,596,697 A | 1/1997 | Foster et al. | 715/810 |
| 5,602,570 A | 2/1997 | Capps et al. | 345/173 |
| 5,613,019 A | 3/1997 | Altman et al. | 382/311 |
| 5,634,102 A | 5/1997 | Capps | 715/744 |
| 5,649,133 A | 7/1997 | Arquie | 715/764 |
| 5,655,136 A | 8/1997 | Morgan | 382/187 |
| 5,666,139 A | 9/1997 | Thielens et al. | 345/173 |
| 5,666,552 A | 9/1997 | Greyson et al. | 715/539 |
| 5,671,438 A | 9/1997 | Capps et al. | 715/539 |
| 5,682,439 A | 10/1997 | Beernink et al. | 382/187 |
| 5,710,831 A | 1/1998 | Beernink et al. | 382/189 |
| 5,745,716 A | 4/1998 | Tchao et al. | 715/777 |
| 5,757,383 A | 5/1998 | Lipton | 345/442 |
| 5,760,773 A | 6/1998 | Berman et al. | 715/808 |
| 5,764,818 A | 6/1998 | Capps et al. | 382/317 |
| 5,768,418 A | 6/1998 | Berman et al. | 382/187 |
| 5,778,404 A | 7/1998 | Capps et al. | 715/531 |
| 5,796,397 A | 8/1998 | Kusano | 715/804 |
| 5,809,498 A | 9/1998 | Lopresti et al. | 707/6 |
| 5,838,326 A | 11/1998 | Card et al. | 715/775 |
| 5,838,819 A | 11/1998 | Ruedisueli et al. | 382/187 |
| 5,864,635 A | 1/1999 | Zetts et al. | 382/187 |
| 5,867,150 A | 2/1999 | Bricklin | 345/173 |
| 5,874,957 A | 2/1999 | Cline et al. | 715/786 |
| 5,880,743 A | 3/1999 | Moran et al. | 345/173 |
| 5,911,145 A | 6/1999 | Arora et al. | 715/514 |
| 5,953,735 A | 9/1999 | Forcier | 715/541 |
| 5,963,208 A | 10/1999 | Dolan et al. | 715/760 |
| 5,970,455 A | 10/1999 | Wilcox et al. | 704/270 |
| 6,020,895 A | 2/2000 | Azami | 345/619 |
| 6,021,218 A | 2/2000 | Capps et al. | 382/187 |
| 6,035,324 A | 3/2000 | Chang et al. | 709/203 |
| 6,061,472 A | 5/2000 | Hullender et al. | 382/187 |
| 6,069,626 A | 5/2000 | Cline et al. | 715/786 |
| 6,081,829 A | 6/2000 | Sidana | 709/203 |
| 6,108,445 A | 8/2000 | Uehara | 382/189 |
| 6,128,007 A | 10/2000 | Seybold | 345/179 |
| 6,128,633 A | 10/2000 | Michelman et al. | 715/206 |
| 6,154,219 A | 11/2000 | Wiley et al. | 345/587 |
| 6,154,758 A | 11/2000 | Chiang | 715/541 |
| 6,188,405 B1 | 2/2001 | Czerwinski et al. | 715/764 |
| 6,195,094 B1 * | 2/2001 | Celebiler | 715/764 |
| 6,199,125 B1 | 3/2001 | Cortesi | 710/67 |
| 6,223,145 B1 | 4/2001 | Hearst | 703/22 |
| 6,243,258 B1 | 6/2001 | Paratore | 361/680 |
| 6,279,014 B1 | 8/2001 | Schilit et al. | 715/512 |
| 6,295,372 B1 | 9/2001 | Hawkins et al. | 382/187 |
| 6,304,272 B1 | 10/2001 | Schanel et al. | 345/676 |
| 6,337,698 B1 | 1/2002 | Keely, Jr. et al. | 715/823 |
| 6,340,967 B1 | 1/2002 | Maxted | 345/179 |
| 6,345,389 B1 | 2/2002 | Dureau | 725/116 |
| 6,348,935 B1 | 2/2002 | Malacinski et al. | 715/853 |
| 6,355,889 B1 | 3/2002 | Butcher | 178/18.03 |
| 6,380,957 B1 | 4/2002 | Banning | 715/828 |
| 6,487,567 B1 | 11/2002 | Michelman et al. | 715/525 |
| 6,487,569 B1 | 11/2002 | Lui et al. | 715/530 |
| 6,529,215 B2 | 3/2003 | Golovchinsky et al. | 715/764 |
| 6,546,397 B1 | 4/2003 | Rempell | 707/102 |
| 6,559,871 B1 | 5/2003 | Brozowski et al. | 715/853 |
| 6,565,611 B1 | 5/2003 | Wilcox et al. | 715/541 |
| 6,570,596 B2 * | 5/2003 | Frederiksen | 715/808 |
| 6,594,390 B2 | 7/2003 | Frink et al. | 382/187 |
| 6,650,347 B1 | 11/2003 | Nulu et al. | 715/853 |
| 6,651,221 B1 | 11/2003 | Thompson et al. | 715/541 |
| 6,654,035 B1 | 11/2003 | DeStefano | 715/798 |
| 6,661,409 B2 | 12/2003 | Demartines et al. | 345/173 |
| 6,678,865 B1 | 1/2004 | Pratley et al. | 715/509 |
| 6,681,045 B1 | 1/2004 | Lapstun et al. | 382/187 |
| 6,683,600 B1 | 1/2004 | Lui | 345/179 |
| 6,690,364 B1 | 2/2004 | Webb | 345/173 |
| 6,727,927 B1 | 4/2004 | Dempski et al. | 715/853 |
| 6,741,749 B2 | 5/2004 | Herbert, Jr. | 382/246 |
| 6,801,190 B1 | 10/2004 | Robinson et al. | 345/173 |
| 6,833,827 B2 | 12/2004 | Lui et al. | 345/173 |
| 6,836,759 B1 | 12/2004 | Williamson et al. | 704/235 |
| 6,859,909 B1 | 2/2005 | Lerner et al. | 715/512 |
| 6,989,822 B2 | 1/2006 | Pettiross et al. | 345/179 |
| 7,002,560 B2 | 2/2006 | Graham | 345/179 |
| 7,039,234 B2 | 5/2006 | Geidl et al. | 382/187 |
| 7,055,110 B2 * | 5/2006 | Kupka | 715/863 |
| 7,079,713 B2 | 7/2006 | Simmons | 382/321 |
| 7,091,959 B1 | 8/2006 | Clary | 345/173 |
| 7,096,432 B2 | 8/2006 | Huapaya | 715/863 |
| 7,174,042 B1 | 2/2007 | Simmons et al. | 382/187 |
| 7,185,278 B1 | 2/2007 | Simmons | 715/235 |
| 7,188,309 B2 | 3/2007 | Simmons et al. | 715/244 |
| 7,240,300 B2 | 7/2007 | Jaeger | 715/863 |
| 7,242,387 B2 * | 7/2007 | Fitzmaurice et al. | 345/157 |
| 7,259,752 B1 | 8/2007 | Simmons | 345/173 |
| 7,259,753 B2 | 8/2007 | Keely et al. | 345/179 |
| 7,353,453 B1 | 4/2008 | Simmons | 715/268 |
| 7,358,965 B2 | 4/2008 | Barabe et al. | 345/179 |
| 7,370,288 B1 | 5/2008 | Simmons et al. | 715/854 |
| 7,526,737 B2 | 4/2009 | Simmons et al. | 715/856 |
| 2001/0000960 A1 | 5/2001 | Dettloff | 343/748 |
| 2002/0078035 A1 | 6/2002 | Frank et al. | 707/3 |
| 2002/0097270 A1 | 7/2002 | Keely et al. | 345/764 |
| 2002/0126153 A1 | 9/2002 | Withers et al. | 345/773 |
| 2003/0066031 A1 | 4/2003 | Laane | 715/513 |
| 2003/0071850 A1 | 4/2003 | Geidl | 345/781 |
| 2003/0085931 A1 | 5/2003 | Card et al. | 345/853 |
| 2003/0119469 A1 | 6/2003 | Karr et al. | 455/307 |
| 2003/0214491 A1 | 11/2003 | Keely et al. | 345/179 |
| 2003/0214531 A1 | 11/2003 | Chambers et al. | 345/764 |
| 2003/0215142 A1 | 11/2003 | Gounares | 382/190 |
| 2003/0227491 A1 | 12/2003 | Moehrle | 345/854 |
| 2004/0003350 A1 | 1/2004 | Simmons et al. | 715/517 |
| 2004/0021701 A1 | 2/2004 | Iwema et al. | 345/863 |
| 2004/0060000 A1 | 3/2004 | Jaeger | 715/502 |
| 2004/0135824 A1 * | 7/2004 | Fitzmaurice | 345/856 |
| 2004/0141015 A1 * | 7/2004 | Fitzmaurice et al. | 345/856 |
| 2005/0028081 A1 | 2/2005 | Arcuri et al. | 715/801.1 |
| 2005/0179647 A1 | 8/2005 | Simmons et al. | 345/156 |
| 2005/0206627 A1 | 9/2005 | Simmons | 345/179 |
| 2006/0001656 A1 | 1/2006 | LaViola et al. | 345/179 |
| 2006/0233464 A1 | 10/2006 | Simmons et al. | 382/321 |
| 2006/0267967 A1 | 11/2006 | Hinckley et al. | 345/179 |

FOREIGN PATENT DOCUMENTS

| | | |
|---|---|---|
| EP | 0 460 420 A3 | 12/1991 |
| EP | 0 780 797 A | 6/1997 |
| EP | 1 376 390 A | 1/2004 |
| EP | 1 450 294 A1 | 8/2004 |
| EP | 1 486 883 A2 | 12/2004 |
| GB | 2 313 993 A | 12/1997 |

| JP | 3-270403 | 12/1991 |

OTHER PUBLICATIONS

Wilcox et al., "Dynomite: A Dynamically Organized Ink and Audio Notebook," Computer-Human Interaction, Mar. 27, 1997, pp. 186-193.
Jakobsen, T., "Advanced Character Physics," Game Developer's Conference, 2001 Proceedings, pp. 1-17.
U.S. Official Action mailed Nov. 19, 2008, in U.S. Appl. No. 10/804,616.
U.S. Official Action mailed Jan. 10, 2008, in U.S. Appl. No. 10/804,616.
U.S. Official Action mailed Jul. 12, 2007, in U.S. Appl. No. 10/804,616.
U.S. Official Action mailed Aug. 5, 2008, in U.S. Appl. No. 10/781,489.
U.S. Official Action mailed Dec. 27, 2007, in U.S. Appl. No. 10/781,489.
U.S. Official Action mailed Jun. 28, 2007, in U.S. Appl. No. 10/781,489.
U.S. Official Action mailed Nov. 7, 2006, in U.S. Appl. No. 10/781,489.
U.S. Official Action mailed Apr. 20, 2006, in U.S. Appl. No. 10/781,489.
U.S. Official Action mailed Aug. 20, 2008, in U.S. Appl. No. 10/780,366.
U.S. Official Action mailed Nov. 14, 2007, in U.S. Appl. No. 10/780,366.
U.S. Official Action mailed Sep. 20, 2005, in U.S. Appl. No. 10/186,463.
U.S. Official Action mailed May 18, 2007, in U.S. Appl. No. 10/186,820.
U.S. Official Action mailed Nov. 24, 2006, in U.S. Appl. No. 10/186,820.
U.S. Official Action mailed Nov. 9, 2006, in U.S. Appl. No. 10/186,820.
U.S. Official Action mailed Mar. 2, 2006, in U.S. Appl. No. 10/186,820.
U.S. Official Action mailed Aug. 10, 2005, in U.S. Appl. No. 10/186,820.
U.S. Official Action mailed Mar. 1, 2006, in U.S. Appl. No. 10/186,837.
U.S. Official Action mailed Dec. 17, 2004, in U.S. Appl. No. 10/186,837.
U.S. Official Action mailed May 25, 2005, in U.S. Appl. No. 10/186,837.
U.S. Official Action mailed Mar. 13, 2006, in U.S. Appl. No. 10/186,812.
U.S. Official Action mailed Jul. 13, 2005, in U.S. Appl. No. 10/186,812.
U.S. Official Action mailed Feb. 28, 2005, in U.S. Appl. No. 10/186,812.
U.S. Official Action mailed Apr. 21, 2006, in U.S. Appl. No. 10/186,865.
U.S. Official Action mailed Sep. 20, 2005, in U.S. Appl. No. 10/186,865.
U.S. Official Action mailed Aug. 22, 2007, in U.S. Appl. No. 10/186,874.
U.S. Official Action mailed Jan. 3, 207, in U.S. Appl. No. 10/186,874.
U.S. Official Action mailed Aug. 10, 2006, in U.S. Appl. No. 10/186,874.
U.S. Official Action mailed Jun. 29, 2005, in U.S. Appl. No. 10/186,874.
U.S. Official Action mailed Sep. 15, 2006, in U.S. Appl. No. 10/186,847.
U.S. Official Action mailed Jan. 27, 2006, in U.S. Appl. No. 10/186,847.
U.S. Official Action mailed Jul. 27, 2005, in U.S. Appl. No. 10/186,847.
U.S. Official Action mailed Jan. 3, 2007, in U.S. Appl. No. 10/782,132.
U.S. Official Action mailed May 29, 2008, in U.S. Appl. No. 11/272,960.
U.S. Final Office Action mailed Feb. 3, 2009, in U.S. Appl. No. 10/781,489.
U.S. Appl. No. 10/780,366, filed Feb. 17, 2004, entitled "Writing Guide for a Free-Form Document Editor", Inventors: Alex Simmons et al.
Microsoft Word 2000, Microsoft Corporation (9.0.6926 p3).
Wacom Intuos TM User's Manual for Windows, May 22, 2000, copyright Wacom Company, Ltd., pp. 1-165.
European Search Report, Nov. 11, 2005.
U.S. Office Action mailed Oct. 22, 2009, in U.S. Appl. No. 11/455,056.

\* cited by examiner

GLOM WIDGET

BACKGROUND OF THE INVENTION

Some personal computers allow a user to "write" on their computer display much as they would write on their notepad. One such computer is a tablet Personal Computer (PC) which typically includes the functionality of a laptop computer but including more input features. For example, a tablet PC allows multi-modal input in which a user can input information into the tablet by writing on the touchscreen with a pen, using a keyboard, or even using their voice. A user can take notes just as they would using traditional pen and paper. Handwriting recognition allows the user's handwriting to be converted into digital text. The form factor of a many touchscreen PCs, however, requires a user to move their entire arm and hand to access the menus and toolbars when they want to perform some sort of command. This is much more difficult and tiring than just moving your hand and wrist a little bit with a mouse on a traditional PC.

SUMMARY OF THE INVENTION

Generally, the present invention is directed at providing a glom widget that provides the pen user of a PC contextual tools near a location where they are writing on the touchscreen.

According to one aspect of the invention, the glom widget is placed next to the node handle associated with the current handwriting. The glom widget is placed such that a user may easily access it without excessive movement of their arm.

According to another aspect of the invention, when the user selects the glom widget, a context menu opens that contains several of the most common tools and/or commands that a user creating handwriting might want to access. The contextual commands are generally easier to comprehend and use since they are presented directly next to the content on the screen to which they relate.

According to yet another aspect of the invention, the menu may be modified. For example, a user may customize the menu to contain commands they commonly use.

DETAILED DESCRIPTION OF THE PREFERRED EMBODIMENT

Generally, the present invention is directed at providing a glom widget near where they are writing on the display. The glom widget provides the pen user of a PC contextual tools near where they are writing. The glom widget is positioned such that user movement is decreased in selecting tools and/or commands when writing on a screen.

Illustrative Operating Environment

Figure 1:
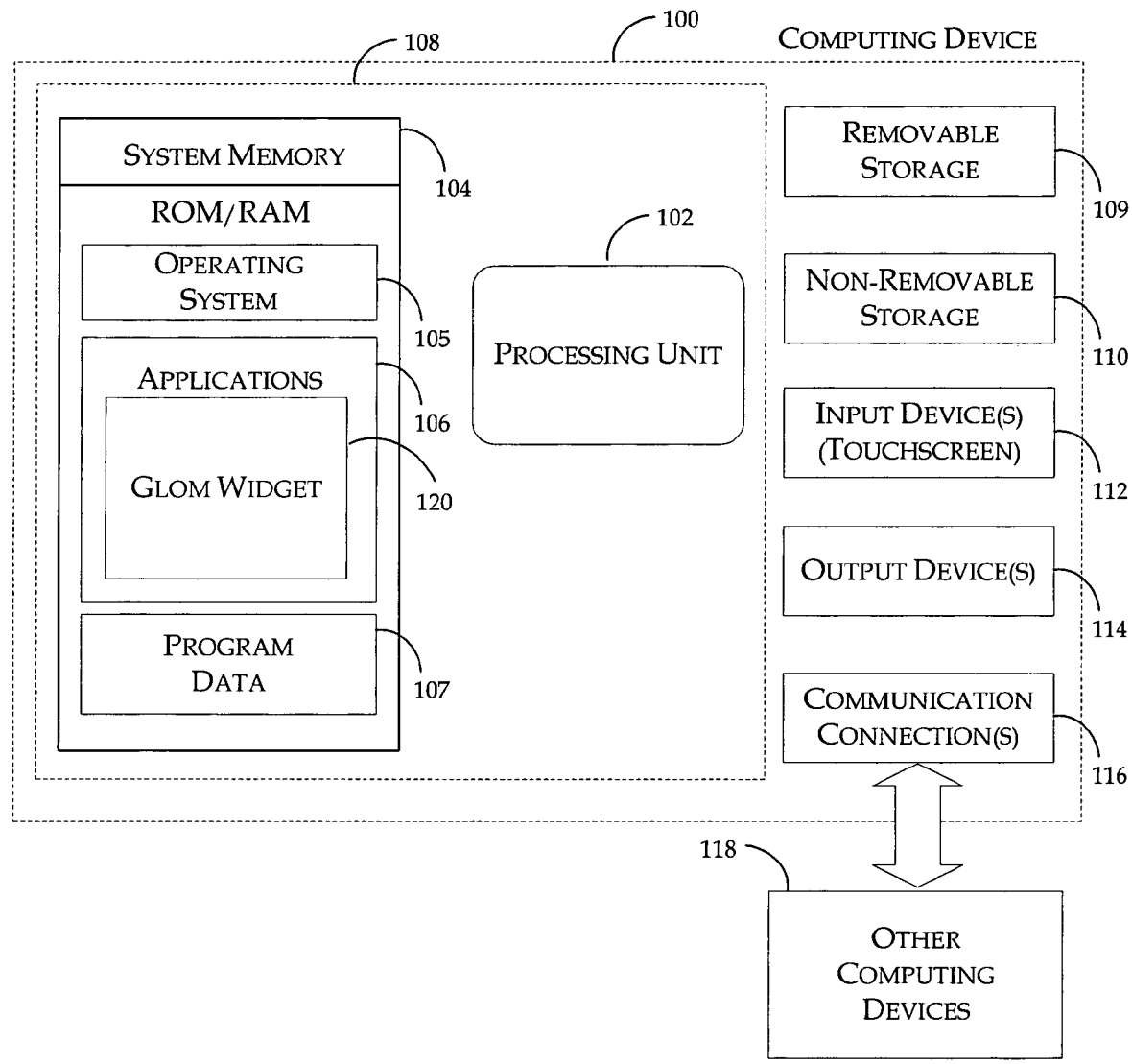
FIG. 1 illustrates an exemplary PC computing device that may be used according to exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as Random Access Memory (RAM)), non-volatile (such as Read Only Memory (ROM), flash memory, etc.) or some combination of the two. System memory 104 typically includes an operating system 105, one or more applications 106, and may include program data 107. A pen and ink interface allows a user to enter writing directly on the touchscreen. In one embodiment, application 106 may include a glom widget application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, Electronically Erasable Programmable Read Only Memory (EEPROM), flash memory or other memory technology, Compact Disc Read Only Memory (CD-ROM), digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100.

Computing device 100 also includes input device(s) 112 such as a touchscreen input device, a stylus (pen), voice input device (speech recognition), an on-screen keyboard and writing pad, keyboard, mouse, etc. For example, a user could use the pen and writing pad to input their handwritten text into applications, and/or use the pen with the on-screen keyboard. Computing device 100 may also include Output device(s) 114 such as an external display, speakers, printer, etc. may also be included.

Computing device 100 may also contain communication connections 116 that allow the device to communicate with other computing devices 118, such as over a network. An exemplary communications connection is a wireless interface layer that performs the function of transmitting and receiving wireless communications. The wireless interface layer facilitates wireless connectivity between computing device 100 and the outside world. According to one embodiment, transmissions to and from the wireless interface layer are conducted under control of the operating system.

Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Glom Widget

Figure 2:
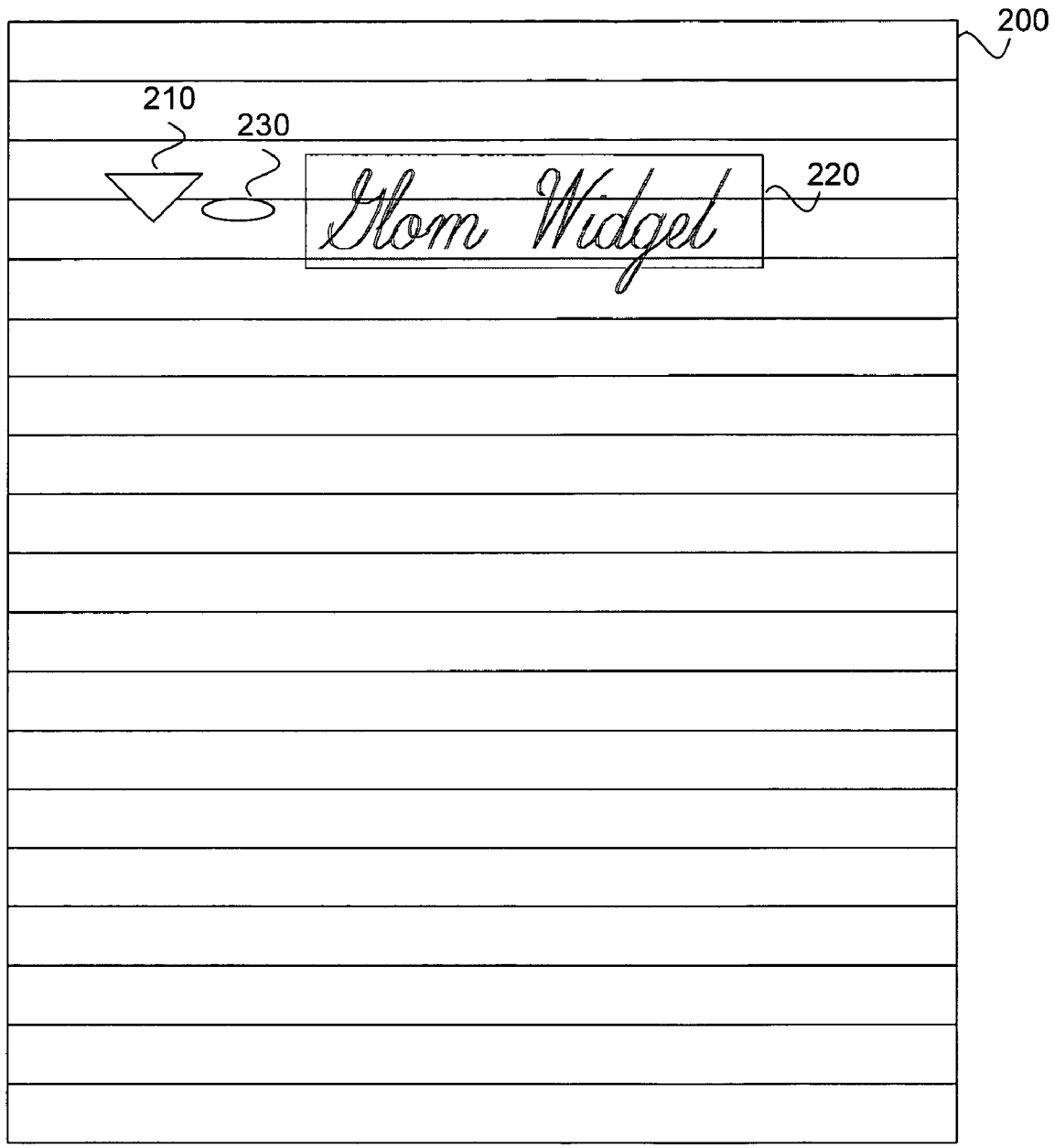
FIG. 2 shows an exemplary screen including a glom widget.

FIG. 2 shows an exemplary screen including a glom widget, in accordance with aspects of the invention. As shown, screen 200 includes glom widget 210, node handle 230, and exemplary writing 220.

Glom widget 210 provides the pen user of a PC access to contextual tools near where they are writing. Glom widget 210 appears next to handwriting 220 that an inking application recognizes. If the user clicks on the glom widget 210, a context menu (see FIG. 3) drops down that contains several of the most common tools and/or commands that a user creating handwriting might want to access. According to one embodiment, the location of the glom widget is based on the input language. For example, for left-to-right language the glom widget may be placed on the left side of the handwriting and for right-to-left language the glom widget may be placed to the right of the handwriting. According to one embodiment, the glom widget appears on the first line of the current paragraph just to the left (⅛ of an inch) of the node handle for left-to-right handwriting. The glom widget, however, may be placed anywhere that is near where the user is writing that does not interfere with the user's writing. For example, the glom widget may be placed somewhere around the text. The location on the right of writing 220 may be useful for right-to-left languages. Glom widget 210 is placed such that a user may easily access it without excessive movement of their arm. According to one embodiment, glom widget 210 is placed closest to the writing before any other icons are placed. For example, if an audio clip icon exists then the clip icon is rendered to the left of the glom widget. According to another embodiment, the user may also specify where they want the glom widget to appear. For example, the user could specify to place the glom widget a quarter of an inch above the current writing.

Figure 3:
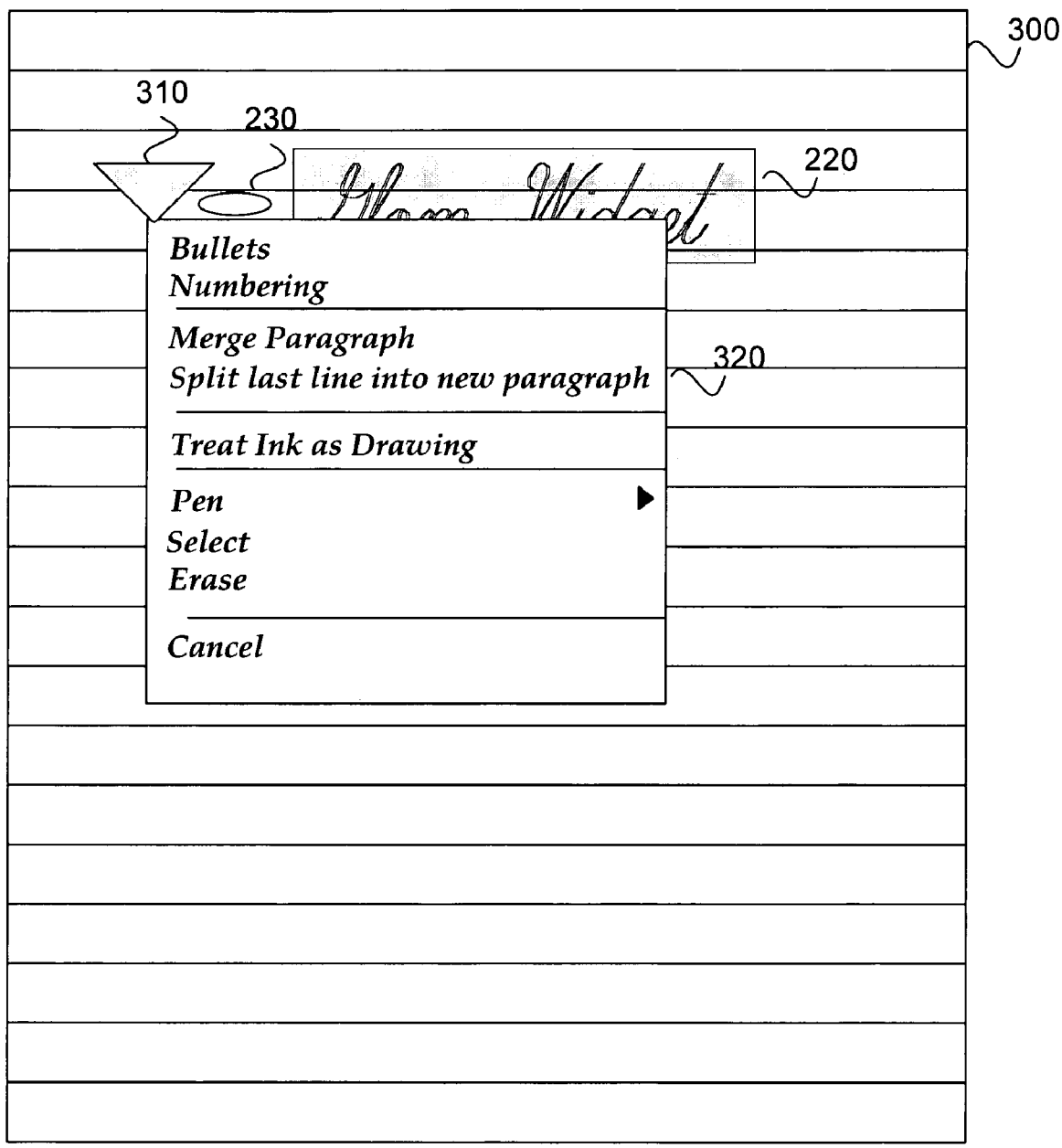
FIG. 3 shows an exemplary screen including a glom widget menu.

FIG. 3 shows an exemplary screen including a glom widget menu, in accordance with aspects of the invention. As shown, screen 300 includes glom widget 310, node handle 230, writing 220, and menu 320.

If the user hovers over the glom widget 210 (as it is shown in FIG. 2), the glom widget changes to a hover shape as illustrated by glom widget 310. The hover behavior of the glom widget appears based on the pens proximity over the glom widget icon and changes slightly when the pen hovers over the top of it.

Once glom widget 310 is clicked on by the user, context menu 320 drops down and contains several of the most common tools and/or commands that a user creating handwriting might want to access. Menu 320 can also contain contextual commands that are easier to comprehend and use since they are presented directly next to the content on the page to which they relate.

Glom widget menu 320 may include any tools and/or commands that help the user. According to one embodiment, menu 320 consists of a set of common tools and commands a pen user uses when writing handwriting on the PC input screen. These include: Bullets; Numbering; Spacer; Merge paragraph with one above; Split last line into new paragraph; Treat Ink as Drawing; Pen (cascade with pen list); Select; Erase; and Cancel which dismisses glom widget menu 320. Menu 320 may also include a list of commands defined by the user. For example, the user could customize menu 320 to only include a subset of the illustrated commands. The user could also add additional commands to menu 320.

The bullets and numbering command allows a user to add bullets or numbering to existing lines of text or the user can create a bulleted list automatically as they type or write.

The merge paragraph command allows a user to merge a node with another. According to one embodiment, the merge command merges the present node with the node above. The merge command is active when the paragraph above is at the same level as the one the user is in (paragraph corresponding to the widget they clicked, could be any individual line from a multi-line paragraph), and when clicked it merges the current paragraph with the one above.

The split command is active on multiple line paragraphs. When selected it inserts a carriage return at the front of the last line in the paragraph. For example, if you had a paragraph that looked like this, 1. This is a sample paragraph of more than one line. The part that is split is the portion on the second line.

Selecting the split command results in the following,

1. This is a sample paragraph of more than one line. The part that is 2. split is the portion on the second line.

The treat ink as drawing instructs the PC to not interpret the writing as text. Another command, "Treat ink as Text" may also be included in the menu to instruct the writing to be treated as text.

The pen command allows a user to select from a palette of pens that may be available to the user. The select command selects the current node. The erase command erases the current node, and the cancel command exits menu 320.

Figure 4:
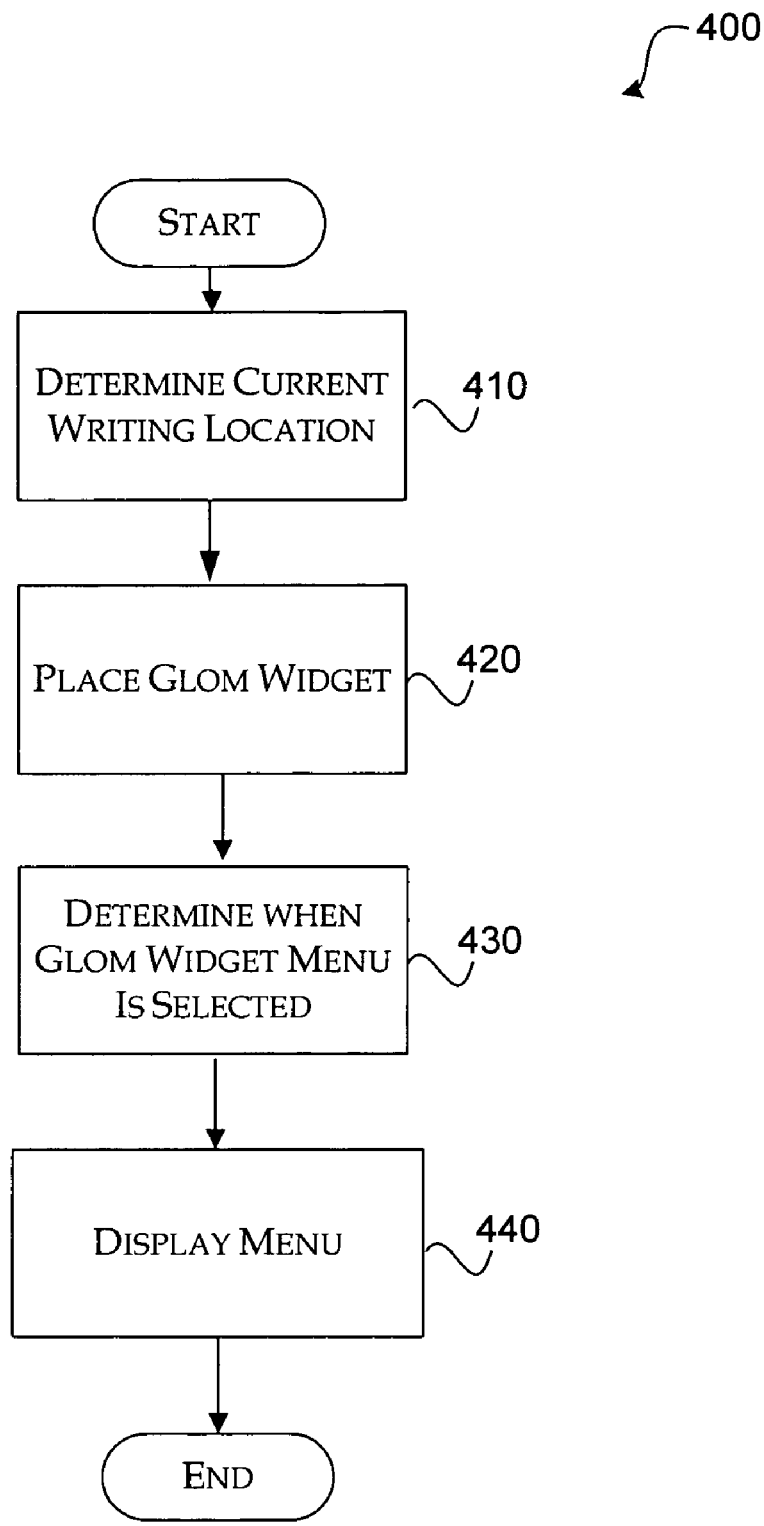
FIG. 4 illustrates a process for utilizing a glom widget, in accordance with aspects of the invention.

FIG. 4 illustrates a process for utilizing a glom widget, in accordance with aspects of the present invention. After a start block, the process flows to block 410 where the current writing location is determined. The current writing location is determined so that the glom widget may be placed in close proximity.

Moving to block 420, the glom widget is placed in close proximity to the writing location. According to one embodiment, the location of the glom widget is based on the input language. For example, for left-to-right language the glom widget may be placed on the left side of the handwriting and for right-to-left language the glom widget may be placed to the right of the handwriting. The location of the glom widget may be placed in any location near the writing that does not interfere with the user's writing. The glom widget is placed such that user movement is reduced as compared to accessing the menu or tool bar for the writing window.

Transitioning to block 430, a determination is made as to when the glom widget is selected. According to one embodiment, the glom widget is selected when a user clicks on the widget. According to one embodiment, when a user hovers over the glom widget it changes visual appearance slightly to provide feedback to the user.

Once selected, the process moves to block 440 where the glom widget menu is displayed. The menu provides the user with a set of commands without having to move their arm excessively across the display to select a menu. The process then steps to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for receiving input in a writing window from a user on a display, comprising:

in response to determining a current handwriting; placing a glom widget at a location next to a node handle that is associated with current handwriting that is located near a current writing location such that the user selects the glom widget with reduced movement as compared to accessing a toolbar associated with the writing window; wherein the glom widget is represented by a single selectable graphic that includes only two states including a selected state and a non-selected state; wherein the location of the placement of the glom widget is specified in part by a user preference;

maintaining the placement of the glom widget at the location next to the node handle such that the glom widget does not move while the glom widget is displayed during any current handwriting and when a glom widget menu is activated; and displaying the glom widget menu having menu items that are associated with handwriting near the current writing location when the glom widget is selected; wherein the glom widget menu comprises the following commands: merge paragraph with a paragraph above; split a last line into a new paragraph; and cancel which dismisses the glom widget menu from being displayed.

2. The method of claim 1, wherein the glom widget menu includes the following commands: bullets; numbering; treat ink as drawing; pen; select; erase and cancel.

3. The method of claim 2, wherein placing the glom widget near the current writing location further comprises placing the glom widget based on an input language being written.

4. The method of claim 3, wherein placing the glom widget near the writing location further comprises placing the glom widget on a left side of the node handle that is associated with the current writing location.

5. The method of claim 2, wherein the glom widget menu comprises a set of contextual commands associated with writing.

6. The method of claim 5, wherein the glom widget menu may be customized.

7. The method of claim 6, further comprising changing an appearance of the glom widget when a user hovers over the glom widget for a predetermined period of time.

8. A system for receiving input from a user on a display, comprising:

a display screen configured to receive user input from a pen; and an application configured to perform actions, including:
    determining a current writing location;
    in response to determining the current handwriting; placing a glom widget at a location next to a node handle that is associated with current handwriting that is located near a current writing location such that the user selects the glom widget with reduced movement as compared to accessing a toolbar associated with the writing window; wherein the glom widget is represented by a single selectable graphic that includes only two states including a selected state and a non-selected state; wherein the location of the placement of the glom widget is specified in part by a user preference;
    maintaining the placement of the glom widget at the location next to the node handle such that the glom widget does not move while the glom widget is displayed during any current handwriting and when a glom widget menu is activated; and
    displaying the glom widget menu having menu items that are associated with handwriting near the current writing location when the glom widget is selected; wherein the glom widget menu comprises the following commands: merge paragraph with a paragraph above; split a last line into a new paragraph; and cancel which dismisses the glom widget menu from being displayed.

9. The system of claim 8, wherein placing the glom widget near the current writing location further comprises placing the glom widget such that user movement to access the glom widget is decreased as compared to accessing a corresponding command contained within a fixed menu.

10. The system of claim 8, wherein placing the glom widget near the writing location further comprises placing the glom widget based on an input language being written.

11. The system of claim 9, wherein the glom widget menu is customizable.

12. The system of claim 9, further comprising changing an appearance of the glom widget when a user hovers over the glom widget for a predetermined period of time.

13. A computer-readable storage medium having computer executable instructions for receiving input on a display, the instructions comprising:

determining a current writing location;

in response to determining the current handwriting; placing a glom widget at a location next to a node handle that is associated with current handwriting that is located near a current writing location such that the user selects the glom widget with reduced movement as compared to accessing a toolbar associated with the writing window; wherein the glom widget is represented by a single selectable graphic that includes only two states including a selected state and a non-selected state; wherein the location of the placement of the glom widget is specified in part by a user preference;

maintaining the placement of the glom widget at the location next to the node handle such that the glom widget does not move while the glom widget is displayed during any current handwriting and when a glom widget menu is activated; and displaying the glom widget menu having menu items that are associated with handwriting near the current writing location when the glom widget is selected; wherein the glom widget menu comprises the following commands: merge paragraph with a paragraph above; split a last line into a new paragraph; and cancel which dismisses the glom widget menu from being displayed.

14. The computer-readable medium of claim 13, wherein placing the glom widget near the current writing location further comprises placing the glom widget such that user movement to access the glom widget is decreased as compared to accessing a corresponding command contained within a fixed menu.

15. The computer-readable medium of claim 13, wherein placing the glom widget near the writing location further comprises placing the glom widget based on an input language being used.

16. The computer-readable medium of claim 14, wherein the glom widget menu comprises a set of commands associated with writing.

17. The computer-readable medium of claim 14, wherein the glom widget menu is customizable.

18. The computer-readable medium of claim 13, further comprising changing an appearance of the glom widget when the glom widget is hovered over for a predetermined period of time.

* * * * *